Figure 1:
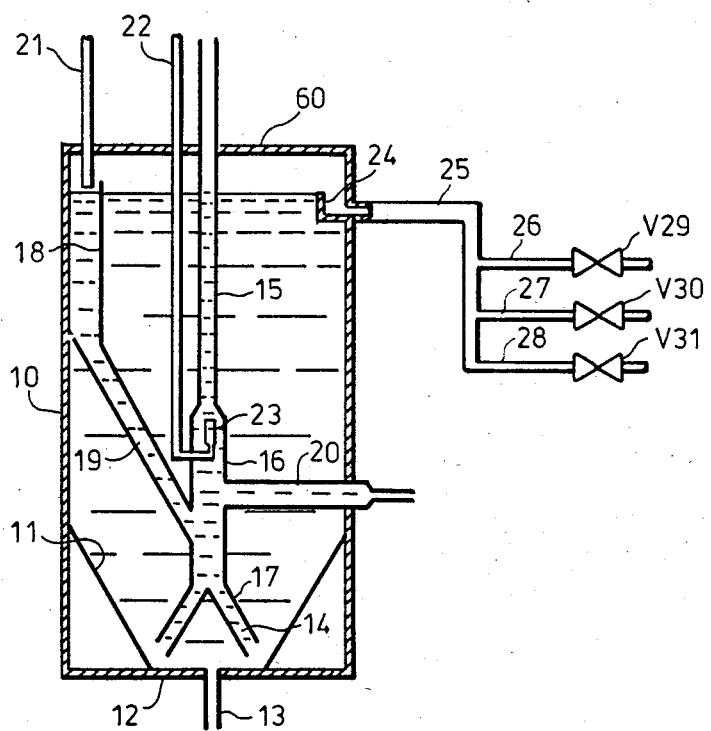

United States Patent [19]

Himsley

[11] Patent Number: 4,604,209

[45] Date of Patent: Aug. 5, 1986

[54] PROCESS FOR LIQUID-SOLID CONTACTING

[76] Inventor: Alexander Himsley, 250 Merton Street, Toronto, Ontario, Canada, M4S 1B1

[21] Appl. No.: 664,741

[22] Filed: Oct. 24, 1984

[51] Int. Cl.⁴ ............................................. B01J 47/10
[52] U.S. Cl. .................................... 210/661; 210/676
[58] Field of Search ............... 210/676, 682, 189, 268, 210/289, 291, 661, 255

[56] References Cited

U.S. PATENT DOCUMENTS

| | | | |
|---|---|---|---|
| 3,879,287 | 4/1975 | Porter | 210/189 |
| 3,957,635 | 5/1976 | Cloete et al. | 210/189 |
| 4,035,292 | 7/1977 | Himsley | 210/33 |
| 4,088,563 | 5/1978 | Marquardt | 210/676 |
| 4,279,755 | 7/1981 | Himsley | 210/676 |

OTHER PUBLICATIONS

Vernon, P. N. et al., "The Rossing Continuous Ion Exchange Plant", Symposium on Ion Exchange and Solvent Extraction, Johannesburg, South Africa, Feb. 1980.

"Rossing Uranium", Mining Magazine, Nov. 1979, pp. 478–479.

"Kerr McGee Nuclear" brochure, Kermac/Kerr McGee, Distributed at least as early as 1980.

Hollis, R. F. et al, "The Resin-in-Pulp Method for Recovery of Uranium", Mining Engineering, Apr. 1957, pp. 443–449.

Merritt, R. C., "The Extractive Metallurgy of Uranium", United States Atomic Energy Commission, 1971, pp. 402, 403, 418, 419, 499 and 503.

*Primary Examiner*—Ivars Cintins
*Attorney, Agent, or Firm*—Ridout & Maybee

[57] ABSTRACT

In a continuous liquid-solid contacting process with intermittent counter-current movement of particles between horizontally adjacent vessels, particle movement is effected by flowing liquid upwardly from a lower region of one vessel through a particle collection conduit into a lower region of an adjacent vessel. The sides of the vessel converge downwardly adjacent the inlet end of the conduit to a collection zone from which the particles can be transferred efficiently. A novel form of vessel for use in apparatus for carrying out the process is also disclosed.

13 Claims, 4 Drawing Figures

PROCESS FOR LIQUID-SOLID CONTACTING

The present invention relates to a process for continuous contacting of liquid and solid particles, more especially, although not exclusively, suitable for use with turbid pregnant liquids supplied at large volume flow rates and containing low concentrations of dissolved materials, e.g. metal ions, which are to be absorbed by the solid particles which may be, for example, ion exchange resin beads or carbon particles.

Applicant's U.S. Pat. No. 4,035,292 shows a vertical column continuous counter-current contactor which is highly efficient in absorbing metal ions or other solutes from turbid pregnant liquids. The arrangement shown, however, has the drawback that the vertically adjacent chambers within the column are not readily accessible for cleaning and maintenance purposes, and relatively large amounts of energy need to be expended in pumping the pregnant liquid up the height of the column. Further, with high volume flow rates, a column of wide diameter is required. Practical difficulties can arise in transporting large diameter pre-fabricated segments of the column to the site where the contactor is to be employed or in attempting to fabricate it on site.

Applicant is aware of prior proposals for continuous contacting of solids with large volume flow rate pregnant liquids, wherein the solids are contained in a series of horizontally adjacent vessels and the liquid is flowed in continuous stream in series through the vessels. Intermittently, loaded particles are removed from the vessel at the end which receives the incoming stream of liquid, and are eluted or otherwise stripped of their loading. Transfer of particles between adjacent vessels is then effected, in a direction counter-current to the stream of pregnant liquid, and the stripped resin particles are introduced into the initial vessel in the series, at the end from which the barren liquid exits. These systems avoid the drawbacks noted above, but with prior proposals of which the inventor is aware, there has been the problem that the transfer of particles between adjacent vessels is not complete. This impairs the efficiency of the process, since for maximum efficiency it is essential that the whole of the particles in the system progress counter-currently to the pregnant liquid stream in the intermittent resin movement step.

In the present invention, substantially complete transfer of the particles between adjacent vessels can be achieved. Each vessel has its side surfaces converging downwardly adjacent its lower end to a collection zone, and has a particle collection conduit having its inlet opening adjacent the collection zone and extending upwardly and transversely to its outlet in the vessel next adjacent in the counter-current direction of the pregnant liquid stream. To effect transfer of particles from one vessel to an adjacent, receiving vessel, which at the time of transfer is substantially empty of particles, the pregnant liquid stream is diverted to by-pass the vessel from which particles are to be transferred and to flow to the inlet of the vessel next adjacent in the co-current direction, and also liquid is flowed to the collection zone of the vessel from which particles are to be transferred, and upwardly through its particle collection conduit and into a lower region of the vessel which is to receive the particles, while withdrawing liquid from the upper region of the vessel receiving the particles. With this arrangement, particles are efficiently collected in the collection zone, and, by virtue of the converging side surfaces of the vessel, do not tend to remain uncollected in the vessel, are entrained in the liquid passing upwardly through the collection conduit, and are slurried up the conduit into the receiving vessel. The flow can be continued until substantially all particles are transferred.

In the preferred form, each vessel has a particle delivery conduit which increases in cross-section toward an outlet adjacent the collection zone, and which receives the slurry of particles from the collection conduit of the vessel next adjacent in the co-current direction. During the resin transfer, liquid is withdrawn from the upper region of the receiving vessel. The gradual decrease in liquid velocity and the evenness of distribution thereby achieved avoids or reduces the persistence of swirling eddy currents in the receiving vessel which might tend to carry particles out of the liquid outlet from the receiving vessel.

In the preferred form, the liquid flowing into the collection zone during particle transfer is drawn from the vessel next adjacent in the counter-current direction to the vessel receiving the particles. This permits hydraulic balance to be maintained in the various liquid flows the avoids back-mixing of particles and liquid, and maintains counter-current contact of the particles and the liquid, since the particles being transferred are transferred in contact with the liquid which will be flowed to them when the system reverts to the normal series flow operation. For example, the liquid of the series stream leaving the vessel next adjacent the counter-current direction to the vessel receiving the particles may be divided into two streams, one flowing to the collection zone of the vessel from which particles are to be transferred at a rate approximately the same as the rate of flow up its particle collection conduit and the other flowing to the vessel which is to receive the particles.

The invention also provides a novel form of vessel especially adapted for use in the present process, and provides a liquid-solid particles contacting vessel having a side wall and a bottom wall, the side wall converging downwardly adjacent its lower end to form a collection zone of reduced width adjacent the bottom wall, a particle delivery conduit extending from an upper region of the vessel and having a portion increasing in cross-section toward a lower end adjacent the collection zone, a particle discharge conduit connecting to said collection zone and extending upwardly above the side wall of the vessel, a primary liquid inlet to the vessel and an auxiliary liquid inlet adjacent said collection zone, and a liquid outlet at the upper region of the vessel.

Figure 2A:
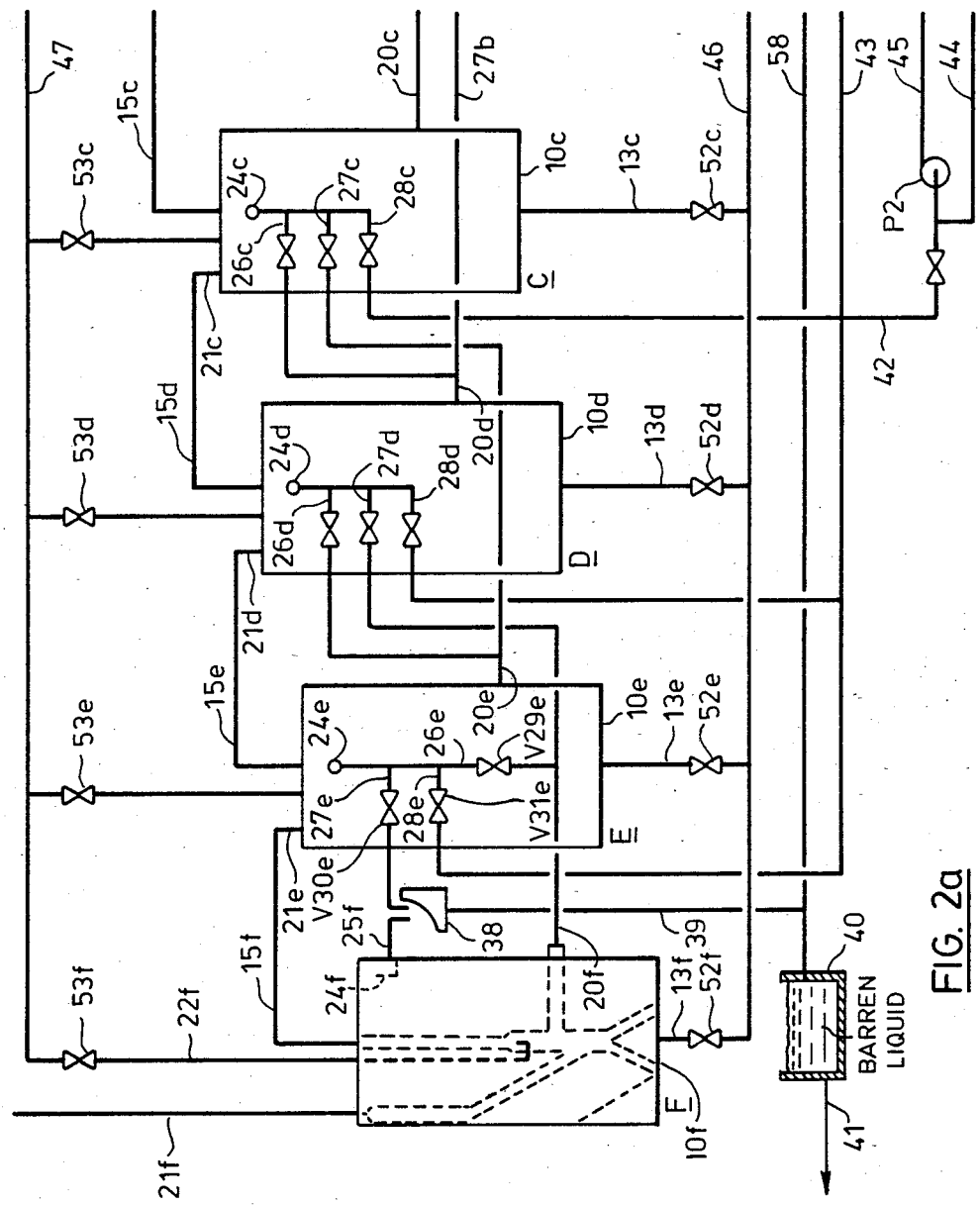
Figure 2B:
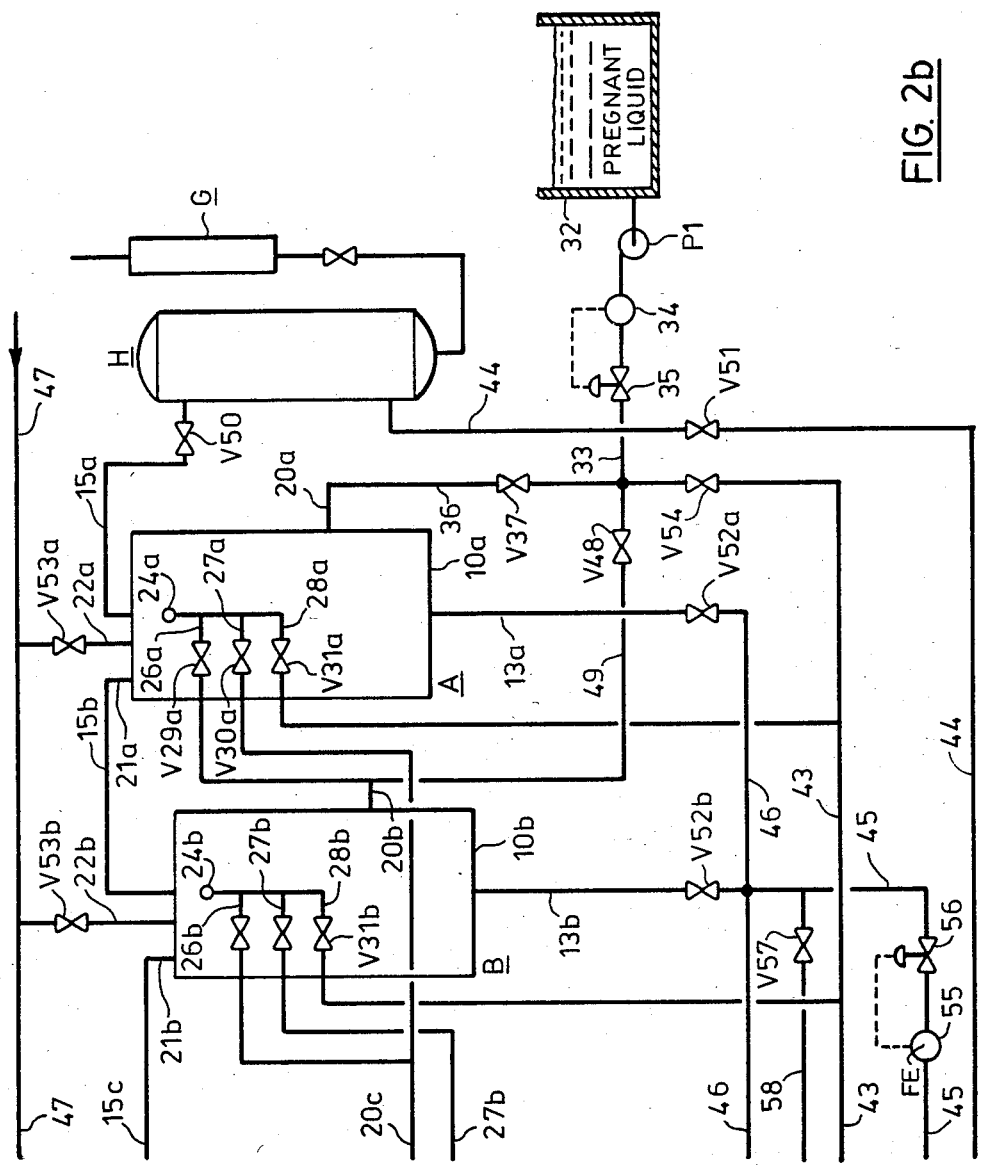
Figure 3:
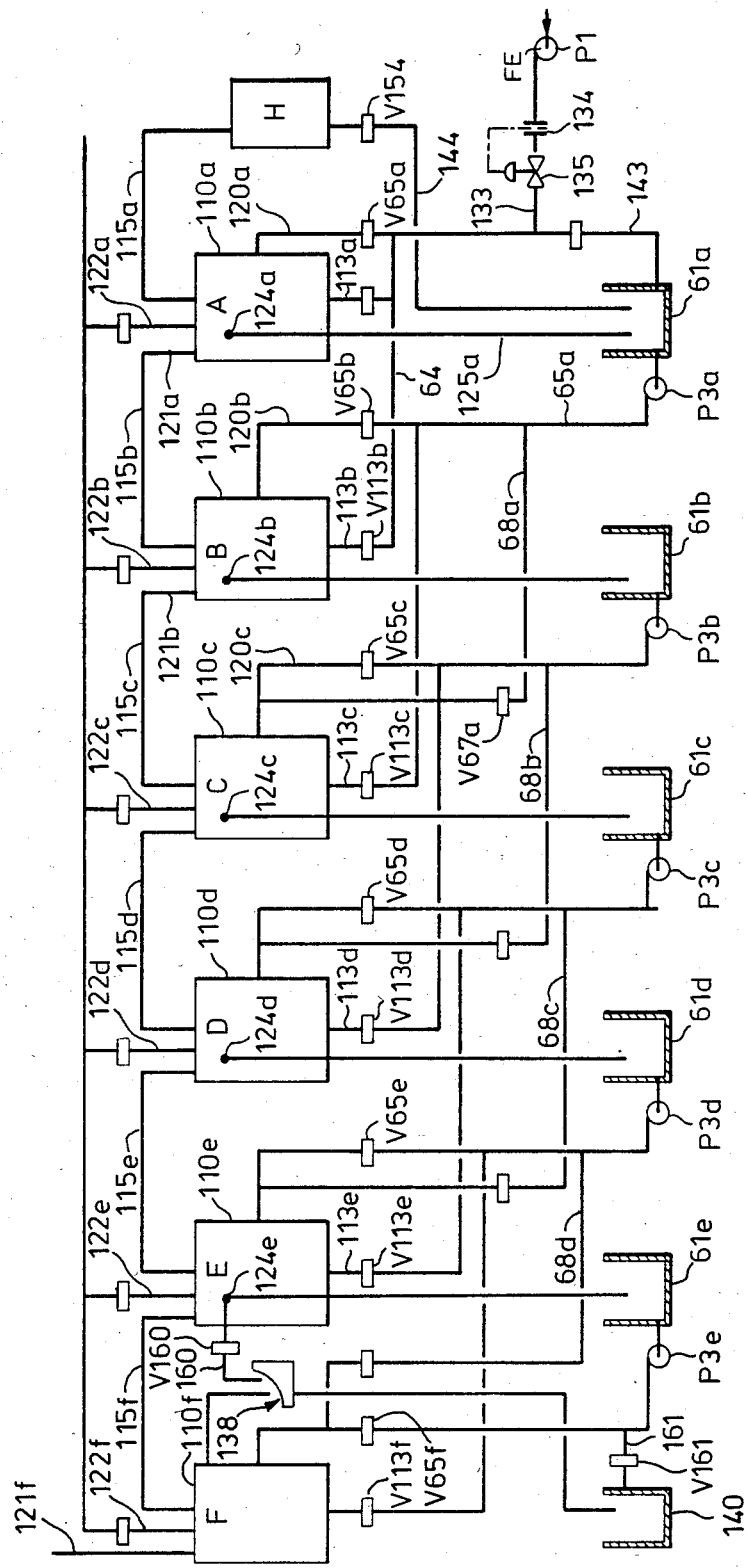

The invention will now be more fully described, by way of example only, with reference to the accompanying drawings, in which:

FIG. 1 shows schematically and partially in cross-section a liquid-solid contacting vessel employed in the process of the present invention;

FIGS. 2a and 2b together show in diagrammatic form one form of apparatus for carrying out the present process; and FIG. 3 shows in diagrammatic form a further form of apparatus for carrying out the present process.

Referring to the drawings, wherein like reference numerals indicate like parts, FIG. 1 shows a cylindrical vessel 10 which has lower inner side walls 11 converging downwardly. For example, in the case of a cylindrical vessel, the walls 11 may define an inverted truncated cone, or in the case of a square or rectangular vessel may define a pyramid. An inlet in the centre of a flat bottom wall 12 of the vessel connects to a conduit 13, through which a recirculating flow may be introduced. Above the inlet of conduit 13 is supported an inverted weir 14, e.g. of conical shape, the lower edge of which defines a uniform, e.g. an annular gap, with wall 12. Supported over the weir 14 is an upwardly extending particle collection conduit 15. This has a relatively wide diameter lower section 16, terminating in a downwardly flaring end 17, e.g. of conical shape. A chute 18 extends downwardly from the upper end of one side of the vessel, for receiving a slurry of particles which are to be transferred into the vessel, and connects with an inclining particle delivery pipe 19 which connects to the wide diameter section 16 of the collection conduit 15. A liquid inlet pipe 20 also connects to the section 16, above the pipe 19. A particle inlet pipe 21 extends into the upper part of the vessel above the chute 18. A gas inlet pipe 22 enters the vessel from above, passes through the wall of the wide section 16 of the conduit 15 and terminates in a gas diffuser 23 whereby gas bubbles can be introduced into the liquid within the conduit 15 to elevate liquid upwardly through the conduit. A liquid outlet at the upper region of the vessel is in the form of an overflow launder 24, to which is connected an outlet conduit 25. In multi-stage apparatus described in more detail below, some of the vessels 10 have branches 26, 27 and 28 from the conduit, controlled by respective valves V29, V30 and V31.

In the apparatus shown in FIGS. 2a and 2b, there are a number of stages, each comprising a vessel as shown in FIG. 1 and lettered generally A, B, C . . . etc., in the co-current direction of flow of the pregnant liquid stream. Components of these vessels similar to the components shown in FIG. 1 are indicated by reference numerals suffixed a, b, c . . . etc.

Also shown is a tank 32 providing a supply of pregnant liquid. This is pumped along a line 33, at a predetermined flow rate, by a pump $P_1$, the flow being controlled by a preset flow element 34 controlling a throttling valve 35.

In normal operation, each of the vessels 10a, 10b, 10c . . . etc., contains ion exchange resin or other absorbent particles capable of accepting a loading, e.g. metal ions, from the pregnant liquid. The pregnant liquid from pump $P_1$ is passed into the vessel 10a of the end stage A through a line 36, and a valve V37, which at this time is open, connecting to the inlet pipe 20a , down conduits 15 and 16 the flaring end portion 17 of the vessel, and upwardly through the particles in the vessel. Overflow from the launder 24a passes along line 26a through open valve V29a to the inlet pipe 20b of stage B. The vessels 10a, 10b, 10c . . . etc., are disposed at progressively lower levels in the direction co-current with the pregnant liquid flow, so that this flows under gravity in series through each of the vessels, the flow through each stage being along pipes and lines disposed similarly to those described above. In stage F the outflow from launder 24f passes along line 25f to a screen 38, which traps any particles overflowing the vessel 10f, and along line 39 to a barren liquid tank 40, from which it may be withdrawn along line 41.

In each vessel 10a, 10b, 10c . . . etc., the upflow of liquid from the lower end of the flaring portion 17 maintains the particles in a quiescent, i.e. non-turbulent, fluidized state, and tends to keep in suspension slimes or other solid contaminants in a turbid pregnant liquid feed, so that these do not tend to accumulate in the vessels, but pass out with the barren liquid from stage F. Any solids contaminants which may settle in the vessel tend to be carried upward from the bottom region of the vessel at the higher velocity achieved by the flow passing through the smaller area existing between side surfaces 11 and the edges of the flaring portion 17.

When breakthrough occurs of non-absorbed solute in the barren liquid exiting stage F, movement of the particles in the direction counter-current to the liquid flow is commenced. At this stage, a batch of eluted particles is present in an elution column G, indicated somewhat schematically in FIG. 2b. The batch of particles in the vessel of stage A is transferred into a measuring and backwashing vessel H, which is full of pregnant liquid but empty of particles. The particles from the vessel of stage B are transferred into the vessel of stage A, and particles are then moved sequentially between adjacent stages, counter-current to the direction of liquid flow, until, after the vessel of stage F has been cleared of particles, the eluted batch from column G is moved to the vessel of stage F, and the particles in vessel H are moved to the elution column G. The cycle of particle movement may then be repeated at the next particle movement stage.

In the example illustrated in FIGS. 2a and 2b the particle movement is assisted by a pump $P_2$, the suction side of which is connected through a line 42 to a line 43 connecting in common to the outlet branches 28a, 28b, 28c, . . . etc., of each of the vessels of stages A through E. The suction side of the pump is also connected through a line 44 to the lower region of the vessel H. The delivery side of the pump $P_2$ is connected through a line 45 to a line 46 connecting in common to the conduits 13a, 13b, 13c . . . etc., of each vessel in stages A through F. The particle movement is effected by air lift from compressed air supplied along a line 47, and connected in common to the gas inlet pipes 22a, 22b, 22c, . . . etc., of each of the vessels of stages A to F.

To move particles from the vessel of stage A to the vessel H, the stream of pregnant liquid from pump $P_1$ is temporarily diverted to by-pass the vessel 10a by closing valve V37 in line 36 and opening a valve V48 in a line 49 connecting between the pregnant liquid feed line 33 and the liquid inlet pipe 20b to the vessel 10b next adjacent in the co-current direction. The flow of pregnant liquid thus continues uninterrupted through the vessels of stages B through F. The valve V29a is closed, and a valve V50 in the particle collection conduit 15a connecting to the upper region of the vessel H is opened, together with a valve V51 in the line 44 connecting the lower region of vessel H to the suction side of pump $P_1$, a valve V52a in the conduit 13a, and a valve V53a in the gas inlet pipe 22a. Within the vessel 10a, liquid is lifted up the collection conduit 15a by the air lift provided by the air line 22a and flows into the vessel H, entraining with it particles from the vessel 10a. Simultaneously, liquid is withdrawn from the lower region of vessel H along the line 44, which may be provided within the vessel H with a strainer to prevent escape of particles, to the suction side of the pump $P_2$ and is recirculated to the vessel 10a along lines 45, 46 and conduit 13a, until substantially all particles have been transferred from vessel A to vessel H.

In order to transfer particles from vessel 10b to vessel 10a, after closing the valves V51, V52a and V53a, the valve V37 connecting the liquid inlet pipe 20a of the vessel 10a to the pregnant feed line 33 is opened, and a valve V30a connecting the launder 24a of the vessel 10a to the liquid inlet pipe 20c of the vessel 10c through the branch outlet conduit 27a is opened.

At the same time, a valve V54 connecting the suction side of the pump P₂ through the line 43 is opened, together with a valve V53b connecting the compressed air line 47 to the air lift inlet line 22b of vessel 10b, and a valve 52b connecting the delivery side of the pump P₂ to the conduit 13b through the line 45. Desirably, the volume flow rate provided by the pump P₂ is controlled, by a flow element 55 and throttling valve 56 to a value less than the flow rate provided by the pump P₁ e.g. to a value 0.2Q where Q is the flow rate provided by the pump P₁ to avoid drawing liquid from the liquid inlet pipe 20a, and to avoid the need to provide the pipe 20a with a strainer internally of the vessel 10a in order to prevent particles being drawn into the pump P₂.

Liquid is elevated up the conduit 15b by the air lift within vessel 10b, and entrains with it particles from the vessel 10b, which pass as a slurry into particle inlet pipe 21a of vessel 10a. The air flow supplied to the line 22b is regulated to be capable of lifting liquid through the conduit 15b and into the vessel 10a at a rate equal to or slightly in excess of the flow introduced in the bottom of vessel 10b through the conduit 13b. The flow into vessel 10a through inlet pipe 20a is reduced by the amount drawn by the pump P₂ along lines 43 and 42, e.g. it will be reduced to 0.8Q. This is, however, compensated by the flow of approximately 0.2Q introduced into vessel 10a through inlet 21a, so that the outflow through the launder 24a to vessel 10c along lines 27a is maintained at approximately Q. Thus, during the resin movement from vessel 10b to vessel 10a flow of the pregnant liquid through vessels 10a, 10c, 10d, 10e and 10f continues uninterruptedly.

The transfer of resin from vessel 10c to 10b, from 10d to 10c, and so on, takes place in a similar manner to that described above, save that the liquid drawn by the pump P₂ is taken from the branch conduit 28 connected to the pregnant liquid series stream passing to the liquid inlet pipe 20 of the vessel receiving the particles. For example, in particle transfer between vessels 10c and 10b, the suction side of the pump P₂ is connected through valve V31a and branch conduit 28a connected to the launder 24a of vessel 10a.

During transfer of eluted particles into vessel 10f, liquid will be drawn by the pump P₂ from line 28e, through valve V31e, while the remainder of the liquid flowing from the launder 24e of vessel 10e is passed along line 26e, through valve V29e to the liquid inlet 20f of vessel 10f. To preserve hydraulic balance, the output of the pump P₂ may be passed through a valve V57 and a line 58 to the barren liquid tank 40.

The sequence of opening and closing of all the valves used in the resin transfer steps has not been described in detail above, but these operations will be readily apparent to those skilled in the art from consideration of the above description and the accompanying drawings.

Referring again to FIG. 1, during the operation of transferring resin out of each vessel, it will be noted that the upflow of liquid pumped up by the pump P₂ through the conduit 13 passes into the interior of the vessel through the narrow endless, e.g. annular, gap defined between the inverted weir 14 and the bottom surface 12 of the vessel at relatively high velocity. The novel form of vessel illustrated thus offers the advantage that this high velocity flow scours out any settled out slimes or other solids contaminants which may accumulate adjacent the bottom surface 12 in the case of treatment of highly turbid pregnant liquids particularly after a plant shutdown or after a long period of no liquid flow.

The downwardly converging surfaces of the side walls 11 of the vessel 10 form adjacent the bottom wall 12 a collection zone, toward which the converging surfaces of the side walls direct the particles inwardly as the bed of particles moves downwardly during the operation of transferring the particles out of the vessel. Thus, the flow of liquid passing up the collection conduit 15, entering from the endless, e.g. annular, gap defined between the lower edge of the weir 14 and the flaring portion 17, efficiently collects particles from the vessel, permitting removal of substantially the entire bed of particles within the vessel.

In the step of transferring particles into a vessel, the slurry of particles entering from the pipe 21 travels down the chute 18 and the pipe 19, and travels down a passageway formed between the weir 14 and the portion 17, this passageway being of flaring form and thus increasing in cross-section downwardly. Thus, the velocity of the resin slurry decreases as it exits into the collection zone. The velocity further decreases as the flow of resin particles travels upwardly, since the cross-section defined by walls 11 increases upwardly. With the novel form of vessel in accordance with the invention, by introducing the resin slurry into the bottom of the vessel, while liquid is passing from the vessel through the overflow or launder 24 at the upper end of the vessel, the bed of particles introduced into the vessel stabilizes relatively rapidly, and swirling eddy currents do not tend to persist in the bed. Thus, the bed of particles can be restored to service relatively rapidly, without need to wait for prolonged periods for eddy currents, which might tend to carry particles up over the overflow or launder 24, to die down.

A modified form of the system illustrated in FIGS. 2a and 2b may be employed when the pregnant liquid is clear or is clarified and does not contain substantial amounts of solid contaminants. In this modified form, instead of employing the pump P₂ to positively introduce through the conduit 13 the liquid which flows into the vessel from which particles are to be transferred, the difference in levels between the vessels is used to permit the liquid to flow from the line supplying the particle-receiving vessel. For example, in the step of transferring particles from the vessel 10a to the vessel H, the line 44 may be connected through the valve V51 direct to conduit 13a. The position of vessel H would be at such elevation as to provide the necessary head for flow to take place. Similarly, in transferring particles from vessel 10b to vessel 10a, the line 43 may be connected through the valve V54 direct to the conduit 13b. In transfer from vessel 10c to 10b, the branch conduit 28b may be connected direct to the conduit 13c, and so on through transfers between subsequent pairs of adjacent vessels.

In the example illustrated, the top of the vessel 10 is shown covered with a lid 60, which is not air-tight in order to permit escape of air which enters the vessel with particle slurry conveyed by the air lift during the resin transfer step. The lid 60 is removable, or the top of the vessel may be left uncovered, to permit access to the interior of the vessel for cleaning and maintenance.

FIGS. 3a and 3b show a further form of system, which functions in a manner broadly similar to that of FIGS. 2a and 2b, comprising a series of vessels 110a, 110b, 110c, . . . etc. Like reference numerals in FIGS. 3a and 3b, raised by 100, indicate parts similar to those of FIGS. 2a and 2b.

In FIGS. 3a and 3b, the vessels 110a, 110b, 110c . . . etc., are arranged at, and have their launders 124a, 124b, 124c, . . . etc., at the same horizontal level. Associated with each of vessels 110a to 110e is a tank or pump box 61a, 61b, 61c . . . etc., which receives the outflow from the launder, e.g. 124a, of its respective tank passing along line 125a, for example. Connected to each pump box is the suction side of a pump $P_{3a}$, $P_{3b}$, $P_{3c}$, . . . etc. normally pumping at the same flow rate as the pump $P_1$. Means are provided to ensure a steady flow and to avoid any pump box 61a, 61b, 61c . . . etc., overflowing in the event that a pump fails. For example, each pump box may be provided with a level switch, which may be set to respond to four liquid levels in the respective pump box, which, in descending order, may be designated as high-high, high, low, and low-low. At high level, the switch closes a throttling valve in the line entering its pump box. At high-high level it may close down the pump $P_3$ in the preceding stage, and at low-low level it closes the pump $P_3$ connected to its pump box. At low level, the switch activates an alarm to indicate to the operator an imbalance due to, for example, pump failure which may require corrective action.

In normal operation, the whole output of pump $P_1$ passes to vessel 110a along line 120a, upwardly through the particles in the vessel, out through line 125a to the pump box 61a to pump P3a, the whole flow from which passes to line 120b of vessel 110b, and so on through the system.

To effect particles transfer from vessel 110a to vessel H, air for air lift is supplied on the line 122a and a small part of the flow Q from pump $P_1$, e.g. 0.2Q, is diverted along a line 64 to the vessel 110a through line 113a whilst the remainder flows through line 143 to pump box 61a. The liquid entering through line 113a is drawn upwardly by the air lift through the particle collection conduit 115a and into the vessel H being returned from the bottom of vessel H through a line 144 and V154 to the pump box 61a. The pump P3a pumps liquid at flow rate Q through a conduit 65a into the conduit 120b connecting to the vessel 110b.

To transfer particles from vessel 110b to vessel 110a, an air lift is provided by supplying pressure on line 122b and a valve V113b is opened in a line 113b connecting the pregnant liquid feed line 133 from the pump P1 through the line 64 to vessel 110b. Valve V65a is also opened. The valve V113b offers somewhat greater resistance to flow than the valve V65a, so that the flow Q from the pump P1 is divided, e.g. at a flow rate 0.8Q along the line 120a, to the vessel 110a and at a flow rate 0.2Q along the line 64 to the line 113b of the vessel 110b and the valve V67a permits a flow rate Q along a line 68a to the inlet pipe 120c of the vessel 110c. The air pressure supplied on the line 122b is controlled so that the flow of liquid in the slurry of particles passing from vessel 110b along line 115b and entering vessel 110a is equal to or slightly greater than 0.2Q. Thus vessel 110a receives 0.2Q from line 121a and 0.8Q from pipe 120a, so that a total flow of Q flows from launder 124a and down line 125a to the pump box 61a.

Similarly, in transferring particles from vessel 110c to vessel 110b, the flow rate Q provided by pump P3a is divided by valves V113c and V65b into a flow 0.2Q along a line 113c to the bottom of vessel 110c and 0.8Q along line 120b to the vessel 110c. An air lift supplied along line 122c conveys a particle slurry with a liquid flow rate of 0.2Q, or slightly greater, along conduit 115c and particle inlet pipe 121b into vessel 110b, which also receives a flow rate of liquid of 0.8Q from pump P3a along inlet pipe 120b. Thus the flow out of launder 124b to pump box 61b totals Q, matching the demand of pump P3b.

The transfer of particles between other adjacent vessels proceeds similarly to the transfer operation described above except for the resin transfers associated with the last two tanks.

The effluent from the last vessel flows over a screen 138 which will collect any resin particles that may be elutriated from the system. These may then be placed back into the vessels. The barren effluent enters a storage tank 140 from which it is pumped to recycle or tailings.

To transfer particles from vessel 110e to vessel 110d, an air lift is provided by supplying pressure on line 122e and a valve V113e is opened in line 113e. Valve V65d is also opened. The flow Q from pump P3c is divided in a similar manner described earlier by the valves V65d and V113e. The flow from launder 124d goes to pump box 61d. From there pump P3d delivers it to vessel 110f and pump P3e is stopped.

Transfer of particles from vessel 110f to vessel 110e along line 115f is done in a similar manner using an airlift provided by supplying pressure on line 122f except that in this case the flow from pump P3d is divided by valves V113f and V65e. However, the flow from launder 124e is diverted directly to the aforementioned screen 138 by valve V160 in line 160 and pump P3e is stopped.

When the last vessel has transferred its resin it is replenished with a batch of freshly eluted resin. This resin is slurried into the vessel through line 121f employing barren solution at a suitable flow rate, e.g. 0.2Q. The pump P3e delivers the volume Q from pump box 61e and this is divided by valves V65f and V161 such that the flow entering the vessel 110f through valve V65f together with the flow of barren solution employed to slurry the eluted resin into vessel 110f approximates to Q.

I claim:

1. Process for the continuous contacting of pregnant liquid with absorbent particles contained in a series of horizontally adjacent vessels, wherein normally an incoming pregnant liquid is flowed in a continuous series stream passing upwardly through each vessel in series, whereby the particles are fluidized and receive a loading from the pregnant liquid, and, periodically, the loaded particles from a vessel at the end of said vessel series receiving the incoming pregnant liquid is removed from said end vessel, and a transfer of particles is effected between adjacent vessels in a direction counter-current to the pregnant liquid stream, the batch of loaded particles removed from said end vessel is stripped of its loading, and an initial vessel in the series is replenished with the stripped batch of particles, characterized in that each vessel has its side surfaces converging downwardly adjacent its lower end to a collection zone, and has a particle collection conduit having its inlet opening adjacent the collection zone and extending upwardly and transversely to its outlet in the vessel next adjacent in said counter-current direction, and said particles transfer is effected from each vessel to the next, which at such time is substantially empty of particles, by diverting said series stream to by-pass the vessel from which particles are to be transferred, and to flow to the vessel next adjacent in the co-current direction of the stream, and particles are transferred in a slurry by withdrawing liquid from the vessel next adjacent in the counter-current direction to the vessel which is to receive the particles, and flowing it into the collection zone of the vessel from which particles are to be transferred and up the particle collection conduit and into a lower region of the vessel which is to receive the particles, while withdrawing liquid from the upper region of the vessel which is to receive the particles, until substantially all the particles have been slurried from one vessel to the next.

2. Process according to claim 1 wherein the liquid of the series stream leaving the vessel next adjacent in the counter-current direction to the vessel receiving the particles is divided into two streams, one flowing to the collection zone of the vessel from which particles are to be transferred at a rate approximately the same as the rate of flow up its particle collection conduit, and the other flowing to the vessel which is to receive the particles.

3. Process according to claim 2 including the step of controlling the rate of flow of said one stream and the rate of said flow up the particle collection conduit each to be less than the flow rate of the series stream.

4. Process according to claim 1 including the step of introducing gas into the particle collection conduit to elevate liquid and particles entrained thereby upwardly through the conduit.

5. Process according to claim 1 including the step of slurrying the particles upwardly through a narrow gap defined between the inlet opening of the collection conduit and the converging side surfaces of the vessel.

6. Process according to claim 5 wherein said converging side surfaces are conical and said gap is annular.

7. Process according to claim 1 wherein said liquid flowed into the collection zone is introduced into the lower end of the vessel from which particles are to be transferred through a narrow gap defined between the bottom surface of the vessel and flow diverting means positioned above said bottom surface.

8. Process according to claim 7 wherein said gap is annular.

9. Process according to claim 1 wherein the liquid level in each vessel is progressively lower in the co-current direction along the series of vessels, and the stream of pregnant liquid flows under gravity.

10. Process according to claim 9 wherein the liquid flowed into the collection zone flows under gravity.

11. Process according to claim 1 wherein the liquid level in each vessel is the same, and the stream of pregnant liquid is pumped between adjacent vessels in the series.

12. Process according to claim 1 wherein the particles are transferred into the receiving vessel next adjacent in the counter-current direction through a delivery conduit having its outlet adjacent the collection zone of the receiving vessel, while withdrawing liquid from the upper region of the receiving vessel.

13. Process according to claim 12 wherein the delivery conduit increases in cross-section toward its outlet, whereby the velocity of the particles is reduced as they pass to the outlet.

* * * * *